Patented Apr. 21, 1931

1,801,766

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

PROCESS OF MAKING POLY NITRO PHENYL THIAZYL SULPHIDES

No Drawing. Original application filed March 2, 1928, Serial No. 258,672. Divided and this application filed February 26, 1929. Serial No. 342,934.

This invention relates to new chemical substances, the poly nitro phenyl benzo thiazyl sulphides, and to a process of making them.

This case is a division of application Serial No. 258,672, filed March 2, 1928.

One of these compounds, 2-4 dinitrophenyl benzothiazyl sulphide may be prepared as follows:

40 grams of sodium hydroxide are dissolved in 500 grams of water and 168 grams of mercapto benzothiazole and 500 cc. of 95% alcohol are added. The mixture is heated to 50–60° C. until all the mercapto benzothiazole has dissolved. 202½ grams of dinitrochlorobenzene are then added and the mixture heated under a reflux condenser until the dinitrochlorobenzene has disappeared. The mixture is then cooled and the 2-4 dinitrophenyl benzothiazyl sulphide which precipitates out is removed by filtration, washed free of sodium chloride, dried and ground. The melting point should be 156–157° C. On further purification the melting point is 162½° C. It is a yellow material crystallizing in prisms that melt at 162½° C. uncorrected. The body is insoluble in water and practically insoluble in cold alcohol. It is fairly soluble in hot alcohol, quite soluble in warm benzol and fairly soluble even in cold benzol. It is soluble in cold acetone. Its alcoholic solution hydrolyzes in the presence of alkali. The probable formula is

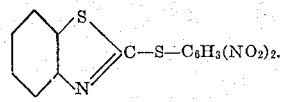

Another example of this class of compounds is 2, 4, 6 trinitrophenyl benzothiazyl sulphide. It may be prepared as follows:

168 grams of mercapto benzothiazole are dissolved in 500 cc. of alcohol and 500 cc. of water by means of 40 grams of sodium hydroxide. The solution then contains the sodium salt of mercapto benzothiazole. To this solution are added 247½ grams of 1 chloro 2, 4, 6 trinitrobenzene. The reaction mixture is then heated until the 1 chloro 2, 4, 6 trinitrobenzene has disappeared which will take about 3 hours. The reaction mixture is then cooled to room temperature whereupon the product which is the 2, 4, 6 trinitrophenyl benzothiazyl sulphide crystallizes out. This is filtered from the reaction liquid, washed free from sodium chloride, and dried. It is a brick-red crystalline material melting after recrystallization from alcohol at 152° C. uncorrected. It is soluble in benzol, insoluble in cold alcohol and only fairly soluble in hot alcohol. It is insoluble in water. The formula of this compound is believed to be

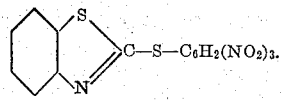

Another example of this class of compounds is 2, 6 dinitro 4 chlorophenyl benzothiazyl sulphide which may be prepared as follows:

168 grams of mercapto benzothiazole are dissolved in 500 cc. of alcohol and 500 cc. of water by means of the addition of 40 grams of sodium hydroxide. The solution then contains the sodium salt of mercapto benzothiazole. To this solution are added 237 grams of 2, 6 dinitro 1.4 dichlorbenzol and the whole heated to 60–70° C. until all of the 2, 6 dinitro 1, 4 dichlorobenzene has disappeared. The reaction mixture is then cooled to room temperature whereupon the product which is the 2, 6 dinitro 4 chlorophenyl benzothiazylsulphide crystallizes out. This is filtered from the reaction mixture, washed free of sodium chloride and dried. This is a yellow body, soluble in benzol, quite soluble in hot alcohol and fairly soluble in cold alcohol. The melting point is 167° C. uncorrected. The formula is

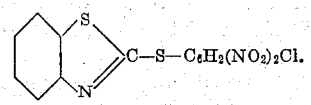

It will be observed that the nitro groups are in the 2, 4 or in the 2, 6 position, and are therefore meta to each other, and in the final compound one nitro group is ortho to the CS bond, with at least one remaining substituent meta to the nitro group.

It will also be observed that these new compounds contain the group

and they may be expressed also as containing

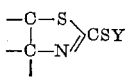

All of these compounds are accelerators of the vulcanization of rubber and all of them have anti-oxidant properties and improve the ageing of rubber, and particularly is this true of the 2-4 dinitrophenyl benzothiazyl sulphide. The 2-4-6 trinitrophenyl benzothiazyl sulphide, which may be also called picryl benzo thiazyl sulphide has the property of improving the flexing of a rubber compound.

Having thus described my invention, what I claim and desire to protect by Letters Patent is:

1. As a new compound 2-6 dinitro 4 chloro phenyl benzo thiazyl sulphide the phenyl group being attached to sulphur at the 2-position.

2. A method of making 2-6 dinitro 4 chloro phenyl derivatives of mercapto benzo thiazoles, which comprises treating a solution of an alkali salt of mercapto benzo thiazole with 2-6 dinitro 1-4 dichloro benzene, heating until the reaction is completed, cooling, then separating and purifying the reaction product.

3. A method of making 2-6 dinitro 4 chloro phenyl derivatives of mercapto benzo thiazoles, which comprises bringing together mercapto benzo thiazole and sodium hydroxide in alcoholic solution, adding 2-6 dinitro 1-4 dichlorobenzene, heating until the reaction is complete, cooling, separating out the reaction product, and purifying it.

4. A method of making 2-6 dinitro 4 chloro phenyl benzo thiazyl sulphide, which comprises mixing an alcoholic solution of mercapto benzo thiazole and a water solution of sodium hydroxide, adding 2-6 dinitro 1-4 dichloro benzene, heating until substantially all the 2-6 dinitro 1-4 dichlorobenzene has disappeared, cooling, filtering out the reaction product, 2-6 dinitro 4 chloro phenyl benzo thiazyl sulphide, and purifying it.

5. As a new material the reaction product of an alkali salt of mercapto benzo thiazole and 2-6 dinitro 1-4 dichloro benzene, said product being substantially insoluble in water.

Signed at Passaic, county of Passaic, State of New Jersey, this 16th day of February, 1929.

SIDNEY M. CADWELL.